United States Patent Office 3,509,091
Patented Apr. 28, 1970

3,509,091
POLYCARBONATES STABILIZED WITH CYCLIC PHOSPHITES
Thomas H. Cleveland and Herbert L. Rawlings, New Martinsville, W. Va., assignors to Mobay Chemical Company, Pittsburgh, Pa., a corporation of Delaware
No Drawing. Filed July 20, 1967, Ser. No. 654,693
Int. Cl. C08g 51/58, 51/04, 51/14
U.S. Cl. 260—45.8                                              7 Claims

ABSTRACT OF THE DISCLOSURE

A stabilized polycarbonate containing a stabilizing amount of a 5,5-dimethyl-1,3,2-dioxaphosphorinane.

---

This invention relates to stabilized polycarbonates and more particularly to a method of stabilizing colored polycarbonates.

One of the most important attributes of a polycarbonate polymer is its transparency to the passage of light. This quality is impared upon the exposure of a polycarbonate to heat or light, the degree of impairment depending on the polymer's "stability." Since the impairment often results in the yellowing of the polymer, in the preparation of polycarbonates generally, but particularly in the preparation of molding grade polycarbonates, it is important that a thermal and/or color stabilizer be incorporated into the polymer in order to provide a resin which will remain color stable.

On the other hand, it had been thought that the color impairment of the polycarbonate could be compensated for by the addition of small amounts of a blue pigment or dye to the polymeric material. However, pigments or dyes tend to increase the instability of the polymer since they generally contain groupings which contribute to the degradation, particularly the oxidation of a polycarbonate, such groups being hydroxyl groups, amino groups, active hydrogen atoms, metal atoms and the like, as well as oxygen adsorbed on the surface of the pigment or dye particles and various other organic and inorganic entities which are detrimental to the integrity of the polycarbonate molecule. Thus, this expedient for combating the impairment of desirable polycarbonate properties has compounded the problem and the same objections hold true for the ultraviolet absorbing agents employed in the art for imparting light stability to polycarbonates. In addition, in the production of colored or tinted polycarbonates where pigments and dyes must of necessity be added to the polycarbonate polymeric material, the problems involved in the stabilization of the product have proven to be substantially insurmountable.

In order to prepare polycarbonate materials which are capable of being employed to their fullest potential in the plastics industry, it is imperative that a thermal and color stabilizer be provided which will not detract from the physical and mechanical properties of the polycarbonate polymer, as well as its brightness or ability to reflect light and its clarity. These considerations are particularly significant in the production of colored polycarbonates wherein the whole polymeric system is less stable than clear or uncolored polycarbonate polymers.

With particular regard to the brightness quality of polycarbonates in general and colored polycarbonates in particular, materials such as titanium dioxide are used in commercial production as a means for maintaining the brightness of polycarbonate polymeric materials. Particularly in the production of colored polycarbonates, large quantities of such materials must be used. Since large quantities or excess quantities of such materials themselves cause the degradation of polycarbonate polymers, a further problem has been encountered in stabilizing polycarbonates which contain them. Notwithstanding, however, even with the added quantities of materials such as titanium dioxide it has been found that it is substantially impossible to commercially produce polycarbonates having the same degree of brightness as the standard chip used as a brightness and color guide. Even further, the added titanium dioxide causes a decrease in the physical and mechanical properties of the polycarbonate, particularly the impact strength, and since such materials are not as thermostable as they should be, the combination of the high temperature and the shear stresses to which the polymers are subjected in manufacturing processes causes the degradation of the polymer and the appearance of black specks, discoloration and streaking.

An additional stability problem is involved in the reprocessing of polycarbonates. For example, a polycarbonate is generally prepared and extruded to yield pellets of the polymer which are shipped to manufactures who engage in grinding the pellets, re-extruding them, molding them, grinding them up again, re-molding them, and so on. The thermostability and mechanical properties of the polycarbonate as well as the color stability of the polymeric product must be maintained under such conditions, particularly in the face of the high temperatures and high shear forces which are applied to the polymer each time it undergoes an additional processing step.

Hence, the problem of stabilizing polycarbonates must be solved from the viewpoint of maintaining their desirable physical and mechanical properties as well as their brightness, reflectivity, color, thermostability, light stability, reprocessability, general resistance to degradation, transparency to the passage of light and so on, particularly when they contain dyes, pigments, ultraviolet absorbing agents and the like.

It is, therefore, an object of this invention to provide a polycarbonate polymer and a method for stabilizing it which is devoid of the foregoing disadvantages.

A further object of this invention is to provide a polycarbonate polymeric material having a high degree of brightness, color stability, light reflectance, light stability, transparency, thermostability, reprocessability, and resistance to shear stresses and the degradation of its physical and mechanical properties.

An additional object of this invention is to provide a stabilizer for polycarbonates which will preclude the requirement for the addition of excess quantities of titanium dioxide and the like materials to the polymer in order to preserve its brightness.

Another object of the invention is to provide a stabilizer for polycarbonates which will permit the fabrication of both colored and non-colored polycarbonates having a high degree of brightness, reflectivity, clarity where desirable, color stability where desired, thermostability, resistance to shear stresses and degradation, color reproducibility where desired and reprocessability, as well as polycarbonates which do not become discolored or streaked on processing, and which do not contain black specks as a result of the degradation of the polycarbonate material.

The foregoing objects and others which will become apparent from the following description are accomplished in accordance with this invention, generally speaking, by providing stabilized polycarbonates as described above which contain as the stabilizer a stabilizing amount of a 5,5-dimethyl-1,3,2-dioxaphosphorinane. The process of this invention encompasses a method for stabilizing polycarbonates of any and all types by the addition thereto of a stabilizing amount of any suitable 5,5-dimethyl-1,3,2-dioxaphosphorinane, and preferably, phenylneopentyl phosphite.

It has been found that the stabilizers of this invention are far superior to any stabilizers heretofore known in the art, including other known phosphorus stabilizers. Not only do the stabilizers of this invention yield polycarbonates, both colored and non-colored, having undegraded physical and mechanical properties such as notched impact strength, for example, throughout their processing and ultimate use, but also polycarbonates having color stability, thermostability, light stability, reprocessability, resistance to shear stresses, general resistance to degradation (thus precluding the black specks and streaking which result therefrom), transparency or opacity where desired, brightness and reflectivity and so on. Particularly with regard to the brightness and reflectivity of polycarbonates it has been found that, with the stabilizers of this invention, it is no longer necessary to add excess amounts of materials such as titanium oxide to polycarbonates in an attempt to attain a high degree of brightness in colored polymers; the stabilizers of this invention alone are capable of maintaining the brightness and color of the pigmented polycarbonate polymer so that there is no difficulty in commercial production in meeting the color and brightness of a standard. A detailed description of the measurement of color and brightness by means of a standard as referred to herein may be found, for example, in ASTM D307–44.

The high degree of efficiency of the stabilizers of this invention is completely unexpected in view of the fact that the 5,5 - dimethyl-2-aryloxy-1,3,2-dioxaphosphorinanes are generally less stable hydrolytically and thermally than, for example, acyclic phosphites. Although the phenomenon involved in the practice of this invention is not completely understood and it is not desired that the invention be limited to any theory of operability, it is postulated that the phosphorinanes of this invention hydrolyze to yield a 2-hydroxy-substituted phosphorinane which acts as the actual active ingredient. The acidic hydrogen of the hydrolysis product buffers the polymer to more effectively utilize the chelating powers of the phosphorous; thus, by the unique combination of the ring structure of the phosphorinanes of this invention and their thermal and hydrolytic instability, they operate simultaneously as water, metal ion and oxygen scavengers.

The amount of the 5,5-dimethyl-1,3,2-dioxaphosphorinanes to be used with any given polycarbonate polymer will vary depending upon the polycarbonate polymer, the additives it contains and so on. It is relatively simple to determine the appropriate amount of stabilizer to be employed in any given case by experimentation. For example, very small amounts of the stabilizer may be added to the polycarbonate and the amount increased gradually until the desired degree of stabilization is obtained. Normally, however, from about 0.025 to about 0.25 percent by weight of the stabilizer based on the weight of the polycarbonate should preferably be used although as little as .001 percent and as much as 2.5 percent may be employed where desired. Less than .001 percent will generally not result in any stabilizing effect on the polycarbonate whereas more than about 2.5 percent by weight will generally not result in any substantial increase in the degree of stabilization, in addition to which more than about 5 percent by weight would be uneconomical.

The 5,5 - dimethyl-1,3,2-dioxaphosphorinanes used in this invention may be prepared by any suitable method such as, for example, those disclosed in U.S. Patents 3,056,824 and 2,834,798. The stabilizer may be added to the polycarbonate in any one of a number of different ways as desired. For example, powdered or granular polycarbonates may be mixed with the stabilizer after which the mixture is extruded into pellets, or into any other form desired, or cast or injection molded. In addition, the stabilizer may be added to a solution of the polycarbonate as it is prepared or it may be added to the polycarbonate melt. The stabilizer may also be added to the components from which the polycarbonate is to be produced or at any time thereafter, particularly since the stabilizers of this invention are soluble in polycarbonates.

The stabilizers of this invention have the formula

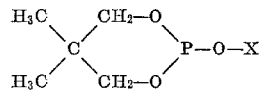

wherein X is hydrogen, an aryl group or an alkyl group. Any suitable aryl, alkyl or cycloalkyl group may be the constituent X, and the aryl or alkyl group may be substituted or unsubstituted as desired with any suitable substituent which is inert with respect to the polycarbonate, its reactants, and any other component of the polycarbonate polymeric product or reaction mixture. Some such suitable substituents include, for example, halogen atoms, such as, for example, chloro, bromo, iodo, fluoro and the like; nitro groups; alkoxy radicals such as, for example, methoxy, ethoxy, propoxy, butoxy, pentoxy and the like; cycloalkoxy radicals such as, for example, cyclohexoxy, cyclopentoxy, cyclobutoxy and the like; carboalkoxy groups such as, for example, carbomethoxy, carbethoxy, carbopropoxy and the like; dialkylamino groups such as, for example, dimethylamino, dipropylamino, methylethylamino and the like; mercapto; phosphonyl; alkyl, preferably having from 1 to about 20 carbon atoms such as, for example, methyl, ethyl, propyl, butyl, pentyl, hexyl, heptyl; cycloalkyl such as, for example, cyclopentyl, cyclohexyl and the like, mixtures of any and all of the foregoing and the like.

Any suitable aryl radical which may either be substituted or unsubstituted may be the constituent X. For example, some such suitable aryl radicals are phenyl, naphthyl and the like, in which case some specific phosphorinanes which may be used in the practice of this invention include, for example, 2-phenoxy-5,5-dimethyl-1,3,2-dioxaphosphorinane,
2-(2-chloro)phenoxy-5,5-dimethyl-1,3,2-dioxaphosphorinane,
2-(3-chloro)-phenoxy-5,5-dimethyl-1,3,2-dioxaphosphorinane,
2-(4-chloro)phenoxy-5,5-dimethyl-1,3,2-dioxaphosphorinane,
2-(2,3-dichloro)phenoxy-5,5-dimethyl-1,3,2-dioxaphosphorinane,
2-(2,4-dibromo)phenoxy-5,5-dimethyl-1,3,2-dioxaphosphorinane,
2-(2,5-diiodo)phenoxy-5,5-dimethyl-1,3,2-dioxaphosphorinane,
2-(2,6-dichloro)phenoxy-5,5-dimethyl-1,3,2-dioxaphosphorinane,
2-(3-bromo)phenoxy-5,5-dimethyl-1,3,2-dioxaphosphorinane,
2-(2,3,4,5,6-pentachloro)phenoxy-5,5-dimethyl-1,3,2-dioxaphosphorinane,
2-(4-iodo)-phenoxy-5,5-dimethyl-1,3,2-dioxaphosphorinane,
2-(2-fluoro)phenoxy-5,5-dimethyl-1,3,2-dioxaphosphorinane,
2-(2-chloro-4-bromo)phenoxy-5,5-dimethyl-1,3,2-dioxaphosphorinane,
2-(2-nonyl)-phenoxy-5,5-dimethyl-1,3,2-dioxaphosphorinane,
2-(2-methyl)phenoxy-5,5-dimethyl-1,3,2-dioxaphosphorinane,
2-(3-ethyl)phenoxy-5,5-dimethyl-1,3,2-dioxaphosphorinane,
2-(4-butyl)phenoxy-5,5-dimethyl-1,3,2-dioxaphosphorinane,
2-(3,5-dimethyl)phenoxy-5,5-dimethyl-1,3,2-dioxaphosphorinane,
2-(2-hexyl)phenoxy-5,5-dimethyl-1,3,2-dioxaphosphorinane,
2-(2-cyclohexyl)phenoxy-5,5-dimethyl-1,3,2-dioxaphosphorinane,
2-(4-octyl)phenoxy-5,5-dimethyl-1,3,2-dioxaphosphorinane, 2-(3-isobutyl)-phenoxy-5,5-dimethyl-1,3,2-dioxaphosphorinane,
2-(2,3,4,5,6-pentamethyl)phenoxy-5,5-dimethyl-1,3,2-dioxaphosphorinane,
2-(4-dodecyl)phenoxy-5,5-dimethyl-1,3,2-dioxaphosphorinane,
2-(2-tertiary-butyl)phenoxy-5,5-dimethyl-1,3,2-dioxaphosphorinane,
2-(2-secondary butyl)phenoxy-5,5-dimethyl-1,3,2-dioxaphosphorinane,
2-(2-nitro)phenoxy-5,5-dimethyl-1,3,2-dioxaphosphorinane,
2-(3-nitro)phenoxy-5,5-dimethyl-1,3,2-dioxaphosphorinane,
2-(2-methoxy)phenoxy-5,5-dimethyl-1,3,2-dioxaphosphorinane,
2-(4-ethoxy)phenoxy-5,5-dimethyl-1,3,2-dioxaphosphorinane,
2-(2-hexoxy)phenoxy-5,5-dimethyl-1,3,2-dioxaphosphorinane,
2-(2-cyclohexoxy)phenoxy-5,5-dimethyl-1,3,2-dioxaphosphorinane,
2-(2,3,4,5,6-pentamethoxy)phenoxy-5,5-dimethyl-1,3,2-dioxaphosphorinane,
2-(3-isobutoxy)phenoxy-5,5-dimethyl-1,3,2-dioxaphosphorinane,
2-(4-dodecoxy)phenoxy-5,5-dimethyl-1,3,2-dioxaphosphorinane,
2-(2-methyl-4-ethyl)phenoxy-5,5-dimethyl-1,3,2-dioxaphosphorinane,
2-(3,5-dipropyl)phenoxy-5,5-dimethyl-1,3,2-dioxaphosphorinane,
2-(2-dimethylamino)phenoxy-5,5-dimethyl-1,3,2-dioxaphosphorinane,
2-(3-dipropylamino)phenoxy-5,5-dimethyl-1,3,2-dioxaphosphorinane,
2-(4-methylethylamino)phenoxy-5,5-dimethyl-1,3,2-dioxaphosphorinane,
2-(2-methyldodecylamino)phenoxy-5,5-dimethyl-1,3,2-dioxaphosphorinane,
2-(2,4-didodecylamino)phenoxy-5,5-dimethyl-1,3,2-dioxaphosphorinane,
2-(3-carbomethoxy)phenoxy-5,5-dimethyl-1,3,2-dioxaphosphorinane,
2-(4-carbohexoxy)phenoxy-5,5-dimethyl-1,3,2-dioxaphosphorinane,
2-(2-phosphonyl)phenoxy-5,5-dimethyl-1,3,2-dioxaphosphorinane,
2-(3-phosphonyl)phenoxy-5,5-dimethyl-1,3,2-dioxaphosphorinane,
2-(2-methoxy-4-carbomethoxy)-phenoxy-5,5-dimethyl-1,3,2-dioxaphosphorinane,
2-(2-dimethylamino-4-methyl)phenoxy-5,5-dimethyl-1,3,2-dioxaphosphorinane,
2-(3-nitro-5-bromo)phenoxy-5,5-dimethyl-1,3,2-dioxaphosphorinane, and the corresponding 2-naphthoxy-5,5-dimethyl-1,3,2-dioxaphosphorinanes of the foregoing and the like.

Any suitable substituted or unsubstituted alkyl or cycloalkyl radical may be the constituent in the foregoing formula, but preferably the alkyl groups should have from 1 to about 18 carbon atoms. Some specific examples of suitable alkoxy phosphorinanes within the scope of this invention are, for example, 2-methoxy-5,5-dimethyl-1,3,2-dioxaphosphorinane,
2-ethoxy-5,5-dimethyl-1,3,2-dioxaphosphorinane,
2-propoxy-5,5-dimethyl-1,3,2-dioxaphosphorinane,
2-butoxy-5,5-dimethyl-1,3,2-dioxaphosphorinane,
2-pentoxy-5,5-dimethyl-1,3,2-dioxaphosphorinane,
2-hexoxy-5,5-dimethyl-1,3,2-dioxaphosphorinane,
2-heptoxy-5,5-dimethyl-1,3,2-dioxaphosphorinane,
2-octoxy-5,5-dimethyl-1,3,2-dioxaphosphorinane,
2-nonoxy-5,5-dimethyl-1,3,2-dioxaphosphorinane,
2-cyclopentoxy-5,5-dimethyl-1,3,2-dioxaphosphorinane,
2-decoxy-5,5-dimethyl-1,3,2-dioxaphosphorinane,
2-dodecoxy-5,5-dimethyl-1,3,2-dioxaphosphorinane,
2-undecoxy-5,5-dimethyl-1,3,2-dioxaphosphorinane,
2-cyclohexoxy-5,5-dimethyl-1,3,2-dioxaphosphorinane,
2-pentadecoxy-5,5-dimethyl-1,3,2-dioxaphosphorinane,
2-eicosanoxy-5,5-dimethyl-1,3,2-dioxaphosphorinane,
2-isopropoxy-5,5-dimethyl-1,3,2-dioxaphosphorinane,
2-tertiary-butoxy-5,5-dimethyl-1,3,2-dioxaphosphorinane and any other isomers of any of the foregoing alkoxy phosphorinanes and the like;

2-(5-iodo)cyclohexoxy-5,5-dimethyl-1,3,2-dioxaphosphorinane,
2-(2-chloro)propoxy-5,5-dimethyl-1,3,2-dioxaphosphorinane,
2-(3-chloro)-cyclohexoxy-5,5-dimethyl-1,3,2-dioxaphosphorinane,
2-(4-chloro)decoxy-5,5-dimethyl-1,3,2-dioxaphosphorinane,
2-(2-chloro-4-iodo)cyclopentoxy-5,5-dimethyl-1,3,2-dioxaphosphorinane,
2-(2,3,5-tribromo)hexoxy-5,5-dimethyl-1,3,2-dioxaphosphorinane,
2-(3-fluoro)cycloheptoxy-5,5-dimethyl-1,3,2-dioxaphosphorinane,
2-(2-chloro-3-bromo)octoxy-5,5-dimethyl-1,3,2-dioxaphosphorinane,
2-(2,3,4,5,6-pentachloro)cyclohexoxy-5,5-dimethyl-1,3,2-dioxaphosphorinane,
2-(20-nitro)eicosanoxy-5,5-dimethyl-1,3,2-dioxaphosphorinane,
2-(3-methoxy)pentoxy-5,5-dimethyl-1,3,2-dioxaphosphorinane,
2-(2,4-diisopropoxy)cyclohexoxy-5,5-dimethyl-1,3,2-dioxaphosphorinane,
2-(3,3-dimethoxy)propoxy-5,5-dimethyl-1,3,2-dioxaphosphorinane,
2-(2,3,4,5,6-pentamethoxy)cyclohexoxy-5,5-dimethyl-1,3,2-dioxaphosphorinane,
2-(5-pentoxy-10-butoxy)decoxy-5,5-dimethyl-1,3,2-dioxaphosphorinane,
2-(3-ethoxy-5-butoxy)cyclopentoxy-5,5-dimethyl-1,3,2-dioxaphosphorinane,
2-(4-dimethylamino)butoxy-5,5-dimethyl-1,3,2-dioxaphosphorinane,
2-(4-carbomethoxy)butoxy-5,5-dimethyl-1,3,2-dioxaphosphorinane,
2-(3,5-dibutoxy)pentoxy-5,5-dimethyl-1,3,2-dioxaphosphorinane,
2-(4-carbopropoxy-6-carbobutoxy)cyclohexoxy-5,5-dimethyl-1,3,2-dioxaphosphorinane,
2-(2-phosphonyl)propoxy-5,5-dimethyl-1,3,2-dioxaphosphorinane,
2-(10,15-diphosphonyl)pentadecoxy-5,5-dimethyl-1,3,2-dioxaphosphorinane,
2-(2,4,6-trimethyl)cyclohexoxy-5,5-dimethyl-1,3,2-dioxaphosphorinane,
2-(3-propyl-5-pentyl)decoxy-5,5-dimethyl-1,3,2-dioxaphosphorinane,
2-(2,3,4-trimethyl)cyclobutoxy-5,5-dimethyl-1,3,2-dioxaphosphorinane,
2-(5-decyl)decoxy-5,5-dimethyl-1,3,2-dioxaphosphorinane,
2-(3-cyclopentyl)propoxy-5,5-dimethyl-1,3,2-dioxaphosphorinane,
2-(6-cyclohexyl)hexoxy-5,5-dimethyl-1,3,2-dioxaphosphorinane,
2-(2-phenyl)ethoxy-5,5-dimethyl-1,3,2-dioxaphosphorinane,
2-(3-chloro-5-nitro)pentoxy-5,5-dimethyl-dioxaphosphorinane,
2-(2-methoxy-4-carbobutoxy)butoxy-5,5-dimethyl-1,3,2-dioxaphosphorinane,
2-(3-bromo-5-phenyl)cyclopentoxy-5,5-dimethyl-1,3,2-dioxaphosphorinane and the like and any of the isomers of any of the foregoing, as well as neopentyl phosphite, and mixtures of any of the foregoing and the like.

The dioxaphosphorinanes of this invention are, generally speaking, phosphites, and they may be used as stabilizers in all type of polycarbonate compositions made by various processes. The polycarbonate composition, for example, can be produced from a dihydroxy diaryl alkane and phosgene or a diester of carbonic acid as described in Canadian Patents 578,585; 578,975; 594,805 and U.S. Patents 3,028,365 and 2,999,835. Other processes contemplated for producing polycarbonates that may be stabilized in accordance with this invention include those referred to in "Polycarbonates" by William F. Christopher and Daniel W. Fox, as well as those disclosed in U.S. Patents 2,999,846; 3,153,008; 3,215,668; 3,187,065; 2,970,131; 2,964,794; 2,991,273 and 3,014,891.

The polycarbonates stabilized according to the process of this invention may contain any effective amount of any suitable additive such as dyes, pigments, fillers, $TiO_2$ and the like, but preferably between about .001 to about 5 percent thereof by weight. Some such suitable pigments which may be employed are, for example, white opaque pigments such as lead, zinc, titanium and antimony oxide pigments, red, maroon and brown inorganic pigments composed of the various oxides of iron; cadmium yellows, cadmium reds and cadmium maroons, such as cadmium sulfoselenides, cadmium sulfides, and the like, green pigments such as chrome greens, chromium oxides and the hydrated chromium oxides; blue pigments such as iron blues and ultramarine blues; carbon blacks, iron oxide blacks and the like. Particular examples of suitable pigments include Pigment Blue 15 (C.I. 74160), Diluted Black-PDS 161 B-192 (Kohnstamm), Solvent Violet 13 (C.I. 60725), Yellow 37 (C.I. 77199), Cadmium Red (C.I. 77196), Croton Fast Green Toner 4D-3600 (Harshaw Chemical Co.), Amaplast Yellow GHS (Drakenfeld), PDS 987 Thermax Blue-Black (Kohnstamm), Marine Blue (Drakenfeld), Scarlet Red 10177 (Drakenfeld), Scarlet Red 10051 (Drakenfeld), phthalocyanine pigments such as, for example, copper phthalocyanine (Monastral Fast Blue B or Heliogen Blue BA), chlorinated copper phthalocyanine (Monastral Fast Green G or Heliogen Green GA), sulfonated copper phthalocyanine, metal free phthalocyanine (Monostral Fast Blue G) and phthalocyanine derivatives in which one or more of the external hydrogen atoms are replaced by other groups such as halogen, alkyl, aryl, amino, nitro, substituted amino, sulfo, carboxy, alkoxy, aryloxy, thiocyano and the like.

As a result of the stabilization power of the phosphorinanes of this invention and the combination of advantageous effects which they exert on polycarbonates in general and colored polycarbonates in particular, the polycarbonates stabilized in accordance with this invention are eminently suitable for use in those applications for which polycarbonates are adapted. For example, the polycarbonates stabilized in accordance with this invention may be used in the preparation of masks, helmets, wall facings, windows, golf balls, skis, golf clubs and for any other suitable application.

The invention is further illustrated but is not intended to be limited by the following examples in which all parts and percentages are by weight unless otherwise specified.

EXAMPLE 1

(A) Preparation of the Polycarbonate

About 454 parts of 4,4'-dihydroxydiphenyl-2,2-propane and about 9.5 parts of p-tertiary-butylphenol are suspended in about 1.5 liters of water. In a three-neck flask equipped with agitation and a gas addition tube, oxygen is removed from the mixture by blowing nitrogen through it while agitating for about 15 minutes. Then about 355 parts of 45% sodium hydroxide and about 1,000 parts of methylene chloride are added. The mixture is cooled to about 25° C. While maintaining this temperature by cooling, about 237 parts of phosgene are added uniformly over about a 120 minute period. An additional about 75 parts each of 45% sodium hydroxide solution are added after about 15 and about 30 minutes respectively after the phosgene addition has begun. To the resulting solution, about 1.6 parts of triethylamine are added and the mixture is agitated for an additional 15 minutes. A highly viscous solution is formed, the viscosity of which is adjusted by the addition of methylene chloride and the aqueous phase is separated. The organic phase is washed with water until free of salt and alkali. The polycarbonate is recovered from the washed solution and dried. The polycarbonate has a relative viscosity of 1.32 measured from a 0.5 percent solution of methylene chloride at 20° C., equivalent to approximately a 34,000 molecular weight product.

The polycarbonate resin is extruded into pellets which are blended with a liquid phosphite stabilizer by tumbling a stabilizing amount of the stabilizer with the resin in a stainless steel container in a Mod 730 D U.S. Stoneware drum tumbler. Where a solid additive such as a pigment, a dye or other stabilizers are to be a component of the composition, it is then added to the resin/phosphite mixture and the resulting mixture is blended in a second tumbling operation. The final resin-additive mixture is homogenized by melting and mixing it in a 1½″ single screw extruder equipped with a screen pack and a strand die. The extruded strands are cooled and chopped into pellets suitable for molding into test specimens or for testing in their unmolded state.

(B) Tests for the Evaluations of Polycarbonate Stability

(1) Pellets (a) *The Minijector stability test.*—The Minijector molding apparatus is adjusted to a cycle which will yield test chips which are 2 inches in diameter by ⅛ inch in thickness. The first few moldings are discarded until the apparatus has reached a proper calibration uniformly throughout, at which time the barrel temperature is adjusted to 600° F. and the cycle is interrupted at the hold period for 10 minutes. Molding is then resumed, the first molding after the resumption of the operation being the test specimen which is compared to an original molding for changes in color values and in appearance such as, for example, the existence of splays, specks, blooming and the like.

(b) *Spiral mold test (Van Dorn injection molder).*—The test pieces are molded in a ram-injection molder at standard barrel conditions of about 625° F. in the rear zone and 600° F. in the front zone in a total cycle time of about 46 seconds. The resin is melted in the barrel and after the ram is actuated it acts as a piston forcing the melt out of the barrel into a die. This is a timed operation run in sequence, the total time per sequence in this case being 46 seconds.

This test subjects the experimental composition to high thermal and shear stresses and is known as a definitive test of the composition's color stability, structural stability and moldability. The test pieces are examined for (1) yellowing, (2) the presence of dark streaks or specks of degraded polymer and (3) for the presence of splays on the surface of the molded piece.

The visual determination of the stability of the melt compared to the standard may be converted to a numerical rating by assigning a score to it of up to 15 according to the degree of stability of the test specimen in each of the three categories above.

(c) *Melt color stability at 300° C.*—The polycarbonate pellets are dried under vacuum at about 150° C. for about a half hour in a glass test tube and are then melted at about 300° C. and held under an atmosphere of air and nitrogen (1 vol.:2 vol.) for about 23½ hours. The melt is compared to a standard and is observed for color change and the development of dark streaks of degraded polymer. The solidified melt may also be sectioned and a section examined spectrophotometrically to determine C.I.E. color values.

(2) Molded specimens (a) *Heat-aging at 130° C.*—A test specimen having a 2 inch diameter by ⅛ inch thickness is molded from pellets of the polycarbonate and exposed to the atmosphere of a circulating air oven controlled at a temperature of 130° C. The specimen is examined spectrophotometrically for changes in color values compared to a standard after an exposure time of 7 days and again after an exposure time of 14 days.

(C) Calculations (1) Yellow-index (YI) ASTM–1925–63T

The yellowness index is a convenient way of referring to the color of a near-white or nearly colorless plastic as a single number. This number is based on the C.I.E. (Commission Internationale de l'Eclairage) Tristimulus Values which are related to the three primary colors as observed by a standard observer defined by the C.I.E. in 1931: that is, red (designated as X), green (designated as Y) and blue (designated as Z), according to the following equation $$YI = \frac{100(1.28X - 1.06Z)}{Y}$$

The larger the YI, the more yellow appearing is the sample. A negative value indicates a blue appearance.

(2) Yellow factor (YF)

This is a NEMA-SPY convention for expressing the change of color of a sample upon exposure to some color modifying treatment such as, for example, heat, based on the light transmittance at three different wave lengths according to the equation $$YF = \frac{100 \times (T_o420 - T_i420) - (T_o680 - T_i680)}{T_o560}$$

$T_o$ represents the transmittance of the original sample before treatment and $T_i$ represents the transmittance after the sample has been subjected to some color modifying treatment.

EXAMPLES 2–8

A polycarbonate prepared as described in Example 1 but having a relative viscosity of about 1.3 and a molecular weight of about 32,000 is blended as described in Example 1 with about 0.05 gm./lb. of Ultramarine violet, about 0.01 gm./lb. of Ultramarine blue and about 1.7 gm./lb. of 2-(2′-hydroxy-5′-methylphenyl)-benzotriazole. Seven samples of the described polycarbonate are taken and a phosphite is added to six of them, the amount of phosphite added varying so that about 50 parts per million of phosphorous is incorporated into each sample, making the molecular structure of the phosphite the only independent variable involved in each sample. Each mixture is then extruded into strands which are cooled and chopped into pellets. Table I shows the results of the application of some of the color stability tests described in Example 1 for each of the samples stabilized as described in Table I. As the data indicates, the cyclic stabilizers of the instant invention excel as polycarbonate stabilizers and the preferred stabilizer of this invention, phenylneopentyl phosphite, is a particularly excellent stabilizer.

TABLE I

| Example | Stabilizer | Concentration, percent | Heat aging at 130° C. $T_o$ 420 m$\mu$, 0 day, percent | YF, 7 days | YF, 14 days | Minijector stability test YI, original | YI, test | Splays area, percent | Melt color stability at 300° C. Visual a | YI |
|---|---|---|---|---|---|---|---|---|---|---|
| 2 | Phenylneopentyl phosphite | .025 | 75.0 | 0.7 | 2.4 | −0.49 | 0.66 | 8 | Blue+ | 1.7 |
| 3 | Neopentyl phosphite | .025 | 74.4 | 1.8 | 3.5 | 0.69 | 2.09 | 0 | Blue+ | 2.4 |
| 4 | Tris(mixed mono- and dinonylphenyl)-phosphite (Polygard) | .07 | 71.1 | 0.7 | 2.9 | 0.32 | 3.47 | 1 | Blue− | 5.6 |
| 5 | Triphenyl phosphite | .03 | 73.0 | 5.4 | 15 | 2.44 | 6.77 | 50 | Blue | |
| 6 | Tridecyl phosphite | .05 | 74.8 | 2.5 | 6.7 | −0.27 | 2.77 | 5 | Yellow | |
| 7 | Phenyl didecyl phosphite | 0.45 | 73.9 | 0.8 | 8.8 | −0.78 | 4.85 | 30 | Violet | |
| 8 | None | | 67.6 | | | 1.16 | 3.79 | 65 | Blue− | 6.2 | a Blue+=unchanged color; blue−=neutral; blue is intermediate between blue− and blue+.

EXAMPLES 9, 10 AND 11

Six samples of the non-phosphite containing basic polycarbonate composition described in Examples 2 through 7 are taken. To the first and fourth samples are added about 0.025% of phenylneopentyl phosphite as described in Example 1. To the second and fifth parts are added about 0.07% of Polygard as described in Example 1. The third and sixth portions are controls. As shown in Table II, the first three samples are subjected to the spiral flow test and the change in relative viscosity, yellow index, and the yellow factor as well as the melt color stability is determined for each sample. Phenylneopentyl phosphite is a superior polycarbonate stabilizer as illustrated by the results of the decisive spiral flow rating test, the retention of bluishness through molding (Yellow Index), through aging at about 130° (Yellow Factor) and through aging in the melt. These same results are demonstrated for samples undergoing multiple extrusion as shown in Table II, for Examples 12, 13 and 14.

TABLE II

| Example | Conc. Percent | Stabilizer Identity | Spiral Flow Length, Inches | Spiral Flow Rating | ΔRelative Viscosity a | ΔYellow Index b | Yellow Factor c | Melt Color Stability d |
|---|---|---|---|---|---|---|---|---|
| 9 | .025 | Phenylneopentyl phosphite | 12.4 | 45 | .020 | −2.7 | 7.4 | Blue. |
| 10 | .07 | Polygard | 12.8 | 35 | .036 | −0.4 | 14.0 | Blue−. |
| 11 | None | Control | 16.7 | 20 | .066 | | 6.5 | Blue. |
| 12 | 0.25 | Phenylneopentyl phosphite | 12.3 | 35 | .022 | −2.3 | 10.0 | Blue−. e |
| | .025 | do | 12.4 | 35 | .016 | −2.0 | 7.7 | Blue. f |
| | .025 | do | 12.6 | 40 | .018 | −2.1 | 12.2 | Blue+. g |
| 13 | .07 | Polygard | 12.8 | 35 | .036 | 0.2 | 14.0 | Blue−. e |
| | .07 | do | 13.5 | 35 | .007 | 1.0 | 13.0 | Blue. f |
| | .07 | do | 13.4 | 30 | .028 | 1.4 | 15.0 | Blue. g |
| 14 | None | Control | 16.8 | 20 | .039 | | 13.1 | Blue. e |
| | None | do | 17.1 | 20 | .049 | | 11.5 | (f) |
| | None | do | 16.8 | 5 | .055 | | 11.0 | Yellow. g | a Change in relative viscosity, pellets—spiral mold.
b Change in yellow index (yellow index of experimental sample minus yellow index of control); Yellow Index is Y.I.=[(1.28X−1.06Z)÷Y]×100.
c Yellow factor after 14 days at 130° C.; Yellow Factor is Y.F.=[(Δ Trans. 420 m$\mu$−Δ Trans. 680 m$\mu$)/Trans. 560 m$\mu$]×100.
d Visual color after 24 hrs. at 300° C.; Blue+ is unchanged color; Blue− is neutral.
e First extrusion.
f Second extrusion.
g Third extrusion.

EXAMPLES 15–17

A polycarbonate is prepared as described in Example 1 but approximately 0.3 mol percent of a trifunctional phenol is included in the reaction mixture. The polycarbonate product has an unusually low transmission at 400 mµ of 61.7%, a molecular weight of about 40,800, and is dry blended and extruded as described in Example 1 with about 0.025 gm./lb. of Calco Oil Violet ZIRS. Three samples of the tinted polycarbonate are taken, the first is a control containing no stabilizer; the second contains 0.05 percent of phenylneopentyl phosphite as a stabilizer and the third contains about 0.05 percent of Polygard. The data in Table II shows the efficacy of phenylneopentyl phosphite as a stabilizer in preventing the yellowing of the tinted formulation during extrusion and molding operations. The use of phenylneopentyl phosphite results in a much bluer and brighter extruded product than the control sample or the sample containing Polygard.

the spiral flow color results. These results serve to buttress the theory that neopentyl phosphite, as the first hydrolysis product of the 2-substituted-5,5-dimethyl-1,3,2-dioxaphosphorinanes of this invention, may be the actual active ingredient in these compositions.

TABLE IV

| Example | Stabilizer | Concentration, p.p.h. | 130° C. Oven | | | Minijector Stability | | | 300° C. Melt | | Spiral Flow [a] YI |
|---|---|---|---|---|---|---|---|---|---|---|---|
| | | | $T_o$ 420 mu, percent | YF, 7 days | YF, 14 days | YI, original | YI, test | Splays area, percent | Visual APHA | YI | |
| 18 | None | | 62.5 | 4.7 | 4.9 | 1.07 | 3.70 | 0 | >500 | 21.1 | 7.6 |
| 19 | Polygard | .05 | 73.3 | 5.5 | 7.6 | 0.19 | 0.16 | 0 | 350 | 10.1 | 5.6 |
| 20 | Neopentyl phosphite | .025 | 71.9 | 4.7 | 4.7 | −0.53 | −0.12 | 5 | (b) | 7.3 | 5.1 |
| 21 | Phenylneopentyl phosphite | .05 | 74.9 | 2.8 | 5.7 | 0.17 | 0.86 | 0 | >500 | 15.7 | 5.7 |

[a] Color of molded piece about 1″ from Sprue.
[b] Violet.

EXAMPLES 22–25

A second series of experiments is carried out using the branched polycarbonate described in Examples 15–17 except that the polycarbonate does not contain a tint, but is a "natural" polycarbonate resin. Because of its high initial color, phosphite stabilizers are tested in this resin to see if they would prevent further discoloration on reextrusion. a "natural" polycarbonate resin. Because of its high initial The dry blending extrusion procedure described in Example 1 is used to incorporate about 0.05 part per 100 of Polygard into one test specimen and about 0.05 part per 100 of phenylneopentyl phosphite into another test specimen. Two other test speciments are used as controls containing no stabilizer, one having been reextruded and the other being virgin polycarbonate resin. The data in Table V shows the excellent stabilizing effect of phenylneopentyl phosphite, particularly as compared to Polygard and the control samples. Further, Tables III and V show that the use of phenylneopentyl phosphite results in a much bluer and brighter extruded product than the control or the Polygard stabilized composition. The initial transmission values at 400 mu as shown in Table V are particularly noteworthy because they indicate that phenylneopentyl phosphite (not only prevents color formation on heat treatment (reextrusion) but causes a color regression to a transmission even better than that of the virgin resin. In addition, the data in Table V shows that the color stabilizing action of phenylneopentyl phosphite operates on the base resin itself and is not merely the result of some interaction between phenylneopentyl phosphite and the dyes, pigments or other components of the polycarbonate resin.

TABLE III

| Example | Stabilizer | Concentration, percent | Molded color | | | |
|---|---|---|---|---|---|---|
| | | | $x$ [a] | $y$ [a] | Y percent [b] | YI |
| 15 | None, control tint | | .3132 | .3185 | 74.2 | 3.32 |
| 16 | Phenylneopentyl phosphite | .05 | .3075 | .3112 | 74.5 | −0.3 |
| 17 | Polygard | .05 | .3115 | .3157 | 73.9 | 1.15 |

[a] $x$ or $y = (X$ or $Y)/(X+Y+Z)$; $X$, $Y$, $Z$ = C.I.E. Tristimulus Values.
[b] Y, by convention, is also considered an index of total transmission or "brightness" of the sample.

EXAMPLES 18–21

A polycarbonate prepared as described in Example 1 and having a relative viscosity of about 1.32 and a molecular weight of about 34,500 is blended and extruded as described in Example 1 with 0.0009 gm./lb. of Amaplast Irisol OR, 0.00021 gm./lb. Calco Oil Violet Special Z, and 1.72 gm./lb. of 2-(2′-hydroxy-5′-methylphenyl)benzotriazole. Four samples are taken, the first being a control containing no stabilizer, the second containing about 0.05 part per 100 parts of Polygard, the third containing about 0.025 part per 100 parts of neopentyl phosphite and the fourth containing about 0.05 part per 100 parts of phenylneopentyl phosphite. The stabilized formulations are tested against the control by exposure to heat at about 130° C. and about 300° C. and by the Minijector and Spiral flow molding tests. The results are set forth in Table IV and disclose the superiority of neopentyl phosphite as a stabilizer, specifically in the melt, as demonstrated by the 300° C. melt color and

TABLE V

| Example | Stabilizer | Concentration, p.p.h. | Molded color | | | | $T_o$ 400 mu, percent |
|---|---|---|---|---|---|---|---|
| | | | $x$ [a] | $y$ [a] | Y percent [b] | YI | |
| 22 | None, reextruded | | .3230 | .3313 | 80.3 | 14.2 | 57.0 |
| 23 | Polygard | .05 | .3231 | .3301 | 74.8 | 13.9 | 56.0 |
| 24 | Phenylneopentyl phosphite | .05 | .3181 | .3254 | 82.9 | 9.8 | 68.0 |
| 25 | None, virgin | | | | | | 61.7 |

[a] $x$ or $y = (X$ or $Y)/(X+Y+Z)$; $X$, $Y$, $Z$ = C.I.E. tristimulus values.
[b] Y, by convention, is also considered an index of the total transmission, "brightness," of a specimen.

EXAMPLES 26-31

A commercial natural polycarbonate resin, that is, one containing no tint or addtitive, prepared as described in Example 1 and having a relative viscosity of about 1.32 and a molecular weight of about 34,000 is divided into test specimens, each of which are blended as described in Example 1 with a stabilizer as set forth in Table VI. The color stability of the natural polycarbonate resin is tested by oven aging at about 130° C. and by the 300° C. melt test. The results summarized in Table VI demonstrate that natural polycarbonate reextruded and stabilized with neopentyl phosphite as a stabilizer has better clarity than the virgin untreated resin; this is exemplified by the initial transmission at 420 mμ. The data in Table VI also demonstrates that the neopentyl phosphite imparts superior color stability to the melt and molded specimens exposed for 14 days to air at temperatures of 130° C. The negative Yellow Factors set forth in Table VI indicate that the treated samples are less yellow (although not necessarily brighter) than the initially untreated sample.

TABLE VI

| Example | Stabilizer | Concentration, percent | Heat aging at 130° | | | Melt color stability at 300° C. APHA |
|---|---|---|---|---|---|---|
| | | | To 420 mμ, percent | YF, 7 days | YF, 14 days | |
| 26 | None, virgin | | 79.2 | -1.5 | -.95 | 150 |
| 27 | None, reextruded | | 77.8 | 1.5 | 3.5 | 350 |
| 28 | Phenylneopentyl phosphite | .025 | 78.5 | 2.7 | -2.0 | 100 |
| 29 | Neopentyl phosphite | .025 | 80.7 | 0.5 | 1.1 | 100 |
| 30 | Polygard | .05 | 79.5 | 0 | 1.3 | 150 |
| 31 | Tris(cyclohexylphenyl)-phosphite | .09 | 79.6 | 4.8 | 9.2 | 150 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A stabilized polycarbonate containing a stabilizing amount of a stabilizer having the formula

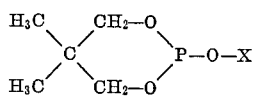

wherein X is hydrogen, an aryl group or an alkyl group.

2. The polycarbonate of claim 1 containing from about .0025 to about 2.5 percent of the stabilizer.

3. The polycarbonate of claim 1 wherein the stabilizer is phenylneopentyl phosphite.

4. The polycarbonate of claim 1 wherein the stabilizer is neopentyl phosphite.

5. The polycarbonate of claim 1 having a high degree of brightness, reflectivity, clarity, color stability, thermostability, resistance to shear stresses and degradation and reprocessability and containing an effective dyeing or pigmenting amount of a dye or pigment for a polycarbonate.

6. The polycarbonate of claim 1 wherein the polymer contains repeating units derived from 2,2(4,4'-dihydroxydiphenyl)propane.

7. The polycarbonate of claim 1 wherein X is a substituted or unsubstituted alkyl, aryl or cycloalkyl radical.

References Cited

UNITED STATES PATENTS

| | | | |
|---|---|---|---|
| 3,398,114 | 8/1968 | Pollock | 260—45.75 |
| 3,398,115 | 8/1968 | Hecker et al. | 260—45.85 |
| 2,867,594 | 1/1959 | Hansen et al. | 260—23 |
| 3,103,501 | 9/1963 | Shearer et al. | 260—45.95 |
| 3,149,181 | 9/1964 | Warren | 260—848 |
| 3,201,369 | 8/1965 | Dell et al. | 260—45.75 |
| 3,305,520 | 2/1967 | Fritz et al. | 260—45.7 |
| 3,322,719 | 5/1967 | Peilstocker | 260—45.8 |
| 3,342,767 | 9/1967 | Buckley | 260—31.8 |
| 3,367,958 | 2/1968 | Kirkendall | 260—45.8 |

DONALD E. CZAJA, Primary Examiner

R. A. WHITE, Assistant Examiner

U.S. Cl. X.R.

260—37, 45.7